(12) United States Patent
Takeuchi

(10) Patent No.: US 6,326,609 B1
(45) Date of Patent: Dec. 4, 2001

(54) SCANNING DRAWING APPARATUS

(75) Inventor: Shuichi Takeuchi, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/414,607

(22) Filed: Oct. 8, 1999

(30) Foreign Application Priority Data

Oct. 12, 1998 (JP) ................................................. 10-289843

(51) Int. Cl.$^7$ ........................................................ B41J 2/47
(52) U.S. Cl. ........................................... 250/234; 347/239
(58) Field of Search .................................. 250/234–236; 347/232, 239, 241, 245, 248; 359/212, 217, 219, 618; 346/107.3, 107.5

(56) References Cited

U.S. PATENT DOCUMENTS

| | | | |
|---|---|---|---|
| 3,573,849 | * 4/1971 | Herriot et al. | 346/108 |
| 4,306,242 | 12/1981 | Jeffery | 346/1.1 |
| 4,978,970 | * 12/1990 | Okazaki | 346/1.1 |
| 5,194,981 | * 3/1993 | Morimoto | 250/235 |
| 5,798,784 | 8/1998 | Nanaka et al. | 347/243 |
| 5,844,592 | * 12/1998 | Iizuka | 347/239 |

FOREIGN PATENT DOCUMENTS 5-264913   10/1993   (JP).

* cited by examiner

Primary Examiner—Stephone B. Allen
(74) Attorney, Agent, or Firm—Greenblum & Bernstein, P.L.C.

(57) ABSTRACT

A scanning drawing apparatus includes a light source, a beam separator for dividing the laser beam into a drawing beam and a monitor beam. A drawing optical path through which the drawing beam travels, and a monitor optical path through which the monitor beam travels are defined. The drawing beam passed through the drawing optical path and the monitor beam passed through the monitor optical path are combined by a beam combiner, and then deflected by a scanning deflector. The deflected beams pass through a scanning lens to form beam spots on an image surface and a monitor scale that is equivalent to the image surface, respectively. The monitor optical path has a different optical path length from the drawing optical path and/or effective diameters of optical elements in the monitor optical path is different from effective diameters of optical elements in the drawing optical path. A deviation of the beam spot of the drawing beam on the image surface due to an inclination or a shift of the light source is equal to a deviation of the beam spot of the monitor beam on the monitor scale in terms of directions and amounts.

12 Claims, 4 Drawing Sheets

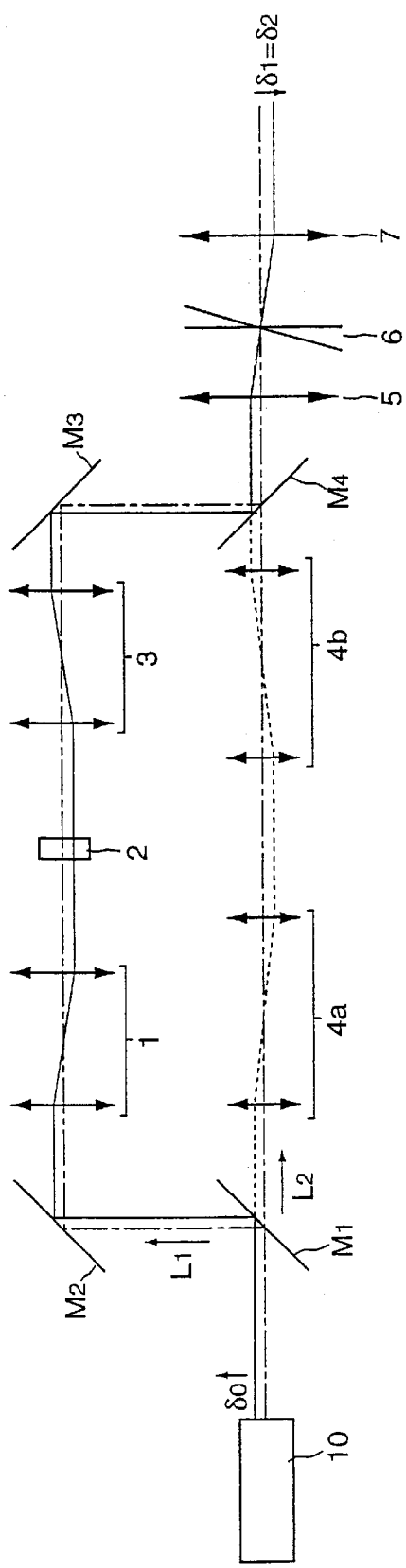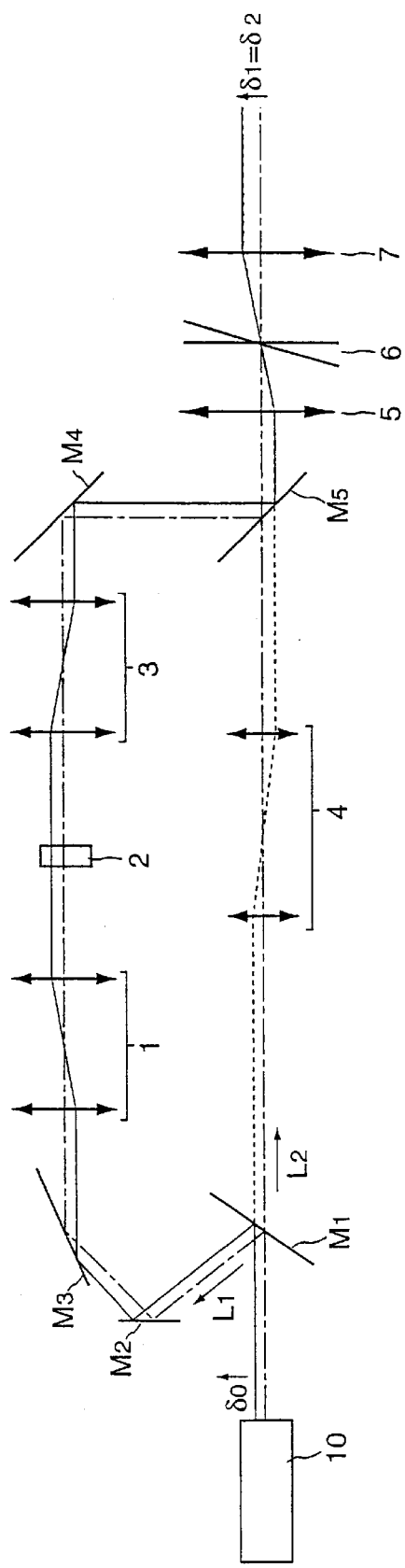

SCANNING DRAWING APPARATUS

BACKGROUND OF THE INVENTION

The present invention relates to a scanning drawing apparatus that is provided with a monitoring optical system for monitoring scanning position of a drawing beam.

The scanning drawing apparatus such as a laser photo plotter, which is relatively large and requires high drawing accuracy, is generally provided with a monitoring optical system for detecting the scanning position of the drawing beam in real time to control modulation of the drawing beam.

FIG. 4 is a developed view of an optical system of a conventional scanning drawing apparatus developed along a main scanning direction. A laser beam emitted from a light source 10 is separated by a half mirror $M_1$ into a drawing beam $L_1$ and a monitor beam $L_2$. The drawing beam $L_1$ is reflected by the half mirror $M_1$ and a mirror $M_2$, passes through a first reducing optical system 1, enters an acoustooptic modulator (AOM) 2, and is incident on a second reducing optical system 3. The drawing beam $L_1$ is then reflected by a mirror $M_3$ and is incident on a half mirror $M_4$. The monitor beam $L_2$, which passes through the half mirror $M_1$, passes through a third reducing optical system 4 and is incident on the half mirror $M_4$.

The drawing beam $L_1$, which is reflected by the half mirror $M_4$, and the monitor beam $L_2$, which passes through the half mirror $M_4$, are combined by the half mirror $M_4$. The combined beams are deflected by a polygon mirror 6 and converged by an fθ lens 7. The drawing beam $L_1$ scans an image surface (not shown) and the monitor beam $L_2$ scans a monitor scale (not shown) that is located at a position that is geometric-optically equivalent to but apart from the image surface.

The monitor scale is a transparent plate on which a large number of opaque lines are formed in a constant pitch. When the monitor beam $L_2$ scans the monitor scale, a photodetector, which receives light passed through the monitor scale, outputs a pulse signal. A controller of the scanning drawing apparatus counts the number of pulses from a predetermined starting point to detect the scanning position of the drawing beam in real time. Then, the controller modulates the drawing beam in accordance with the detected scanning position.

The monitor optical path between the half mirrors M, and $M_4$ through which only the monitor beam $L_2$ travels is shorter than the drawing optical path between the half mirrors $M_1$ and $M_4$ through which only the drawing beam $L_1$ travels. It is because the drawing optical path includes the reducing optical systems 1 and 3 at both sides of the AOM 2 and requires a certain length, while the monitor optical path only includes the reducing optical system 4.

Further, when the drawing apparatus employs a multiple drawing beam system in which a plurality of drawing beams simultaneously scan the image surface, a beam separator is arranged between the half mirror $M_1$ and the first reducing optical system 1 for dividing the incident laser beam into a plurality of parallel drawing beams, which also requires longer optical path length and a larger effective diameter of each optical element arranged in the drawing optical path.

Since the drawing optical path is different from the monitor optical path in the optical path length and/or the effective diameter of the elements arranged therein, magnifications, the number of mirrors and the like are different between the drawing optical path and the monitor optical path. Therefore, a deviation of the beam spot of the drawing beam $L_1$ on the image surface due to an inclination or a shift of the light source 10 is not coincident with a deviation of the beam spot of the monitor beam $L_2$ on the monitor scale in terms of directions and amounts.

For instance, when the light source 10 is at the proper position so that the optical axis of the light source 10 is coincident with the optical axis of the optical system indicated by a single-dot chain line in FIG. 4, the drawing beam $L_1$ and the monitor beam $L_2$ travel along the optical axis of the optical system, which does not cause the deviation between the beams.

If the light source 10 shifts in the upward direction in FIG. 4 by $\delta_0$, the drawing beam $L_1$ travels along a solid line and the beam spot on the image surface shifts in the downward direction by $\delta_1$, while the monitor beam $L_2$ travels along a dotted line and the beam spot on the monitor scale shifts in the upward direction by $\delta_2$.

When a gas laser is used as the light source 10, the optical 10 axis thereof may shift or incline in accordance with a lapse of time after turning ON of the light source. Further, an exchange of the light source 10 due to the termination of the useful life may cause the deviation of the optical axis thereof.

The difference of the deviations between the drawing beam $L_1$ and the monitor beam $L_2$ makes it difficult to maintain a correlation between the monitor signal and the scanning position of the drawing beam, which disables an accurate control of the modulation.

SUMMARY OF THE INVENTION

It is therefore an object of the present invention to provide an improved scanning drawing apparatus, which is capable of keeping the correlation between the monitor signal and the scanning position so that the drawing beam is accurately controlled even if the optical axis of the light source shifts or inclines.

For the above object, according to the present invention, there is provided a scanning drawing apparatus, which includes:

a light source for emitting a laser beam;

a beam separator for dividing the laser beam from the light source into a drawing beam and a monitor beam;

a drawing optical path through which the drawing beam travels;

a monitor optical path through which the monitor beam travels, the monitor optical path having a different optical path length from the drawing optical path and/or effective diameters of optical elements in the monitor optical path being different from effective diameters of optical elements in the drawing optical path;

a beam combiner for combining the drawing beam from the drawing optical path and the monitor beam from the monitor optical path;

a scanning deflector for deflecting the drawing beam and the monitor beam combined by the beam combiner; and a scanning lens for converging the drawing beam and the monitor beam deflected by the scanning deflector to form beam spots on an image surface and a monitor scale, respectively, the monitor scale being geometric-optically equivalent to the image surface;

wherein a deviation of the beam spot of the drawing beam on the image surface due to an inclination or a shift of the light source is coincident with a deviation of the beam spot of the monitor beam on the monitor scale in directions and amounts.

With this construction, the deviation of the drawing beam on the image surface is coincident with the deviation of the monitor beam on the monitor scale in their directions and amounts, which enables to keep the correlation between the monitor signal and the scanning position of the drawing beam even if the light source shifts and/or inclines.

When a difference between the number of times of reflections in a main scanning direction through the monitor optical path and that through the drawing optical path is an even number, it is preferable to satisfy the following condition;

$$m_M \approx m_D$$

where $m_M$ is a magnification of an optical system between the light source and the monitor scale through the monitor optical path, and $m_D$ is a magnification of an optical system between the light source and the image surface through the drawing optical path.

When the difference is an odd number, it is preferable to satisfy the following condition;

$$m_M \approx -m_D.$$

Further, the light source may be optically conjugate with the monitor scale through the monitor optical path, and the light source may be optically conjugate with the image surface through the drawing optical path. The optically conjugate relationships can reduce the deviations of the drawing beam on the image surface and the deviations of the monitor beam on the monitor scale due to the inclination of the optical axis of the light source.

Still further, a variable power optical system may be located between the light source and the beam separator for adjusting a beam diameter of the laser beam emitted from the light source.

DESCRIPTION OF THE ACCOMPANYING DRAWINGS

FIG. 3A is a simplified developed view of the optical system having even number of mirrors;

FIG. 3B is a simplified developed view of the optical system having odd number of mirrors.

DESCRIPTION OF THE EMBODIMENTS

Figure 1:
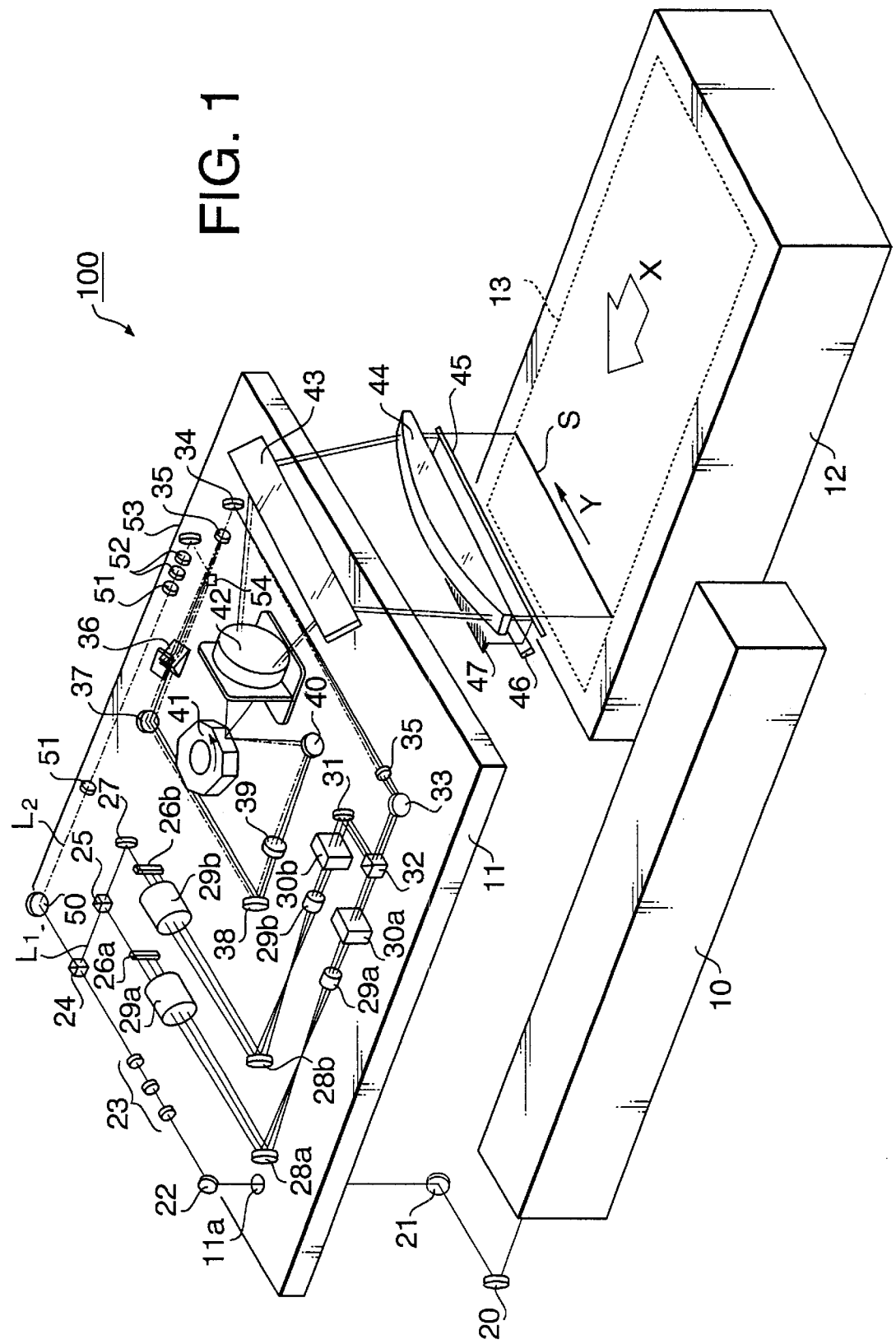
FIG. 1 is a perspective view of a scanning drawing apparatus according to an embodiment of the present invention.
Figure 2:
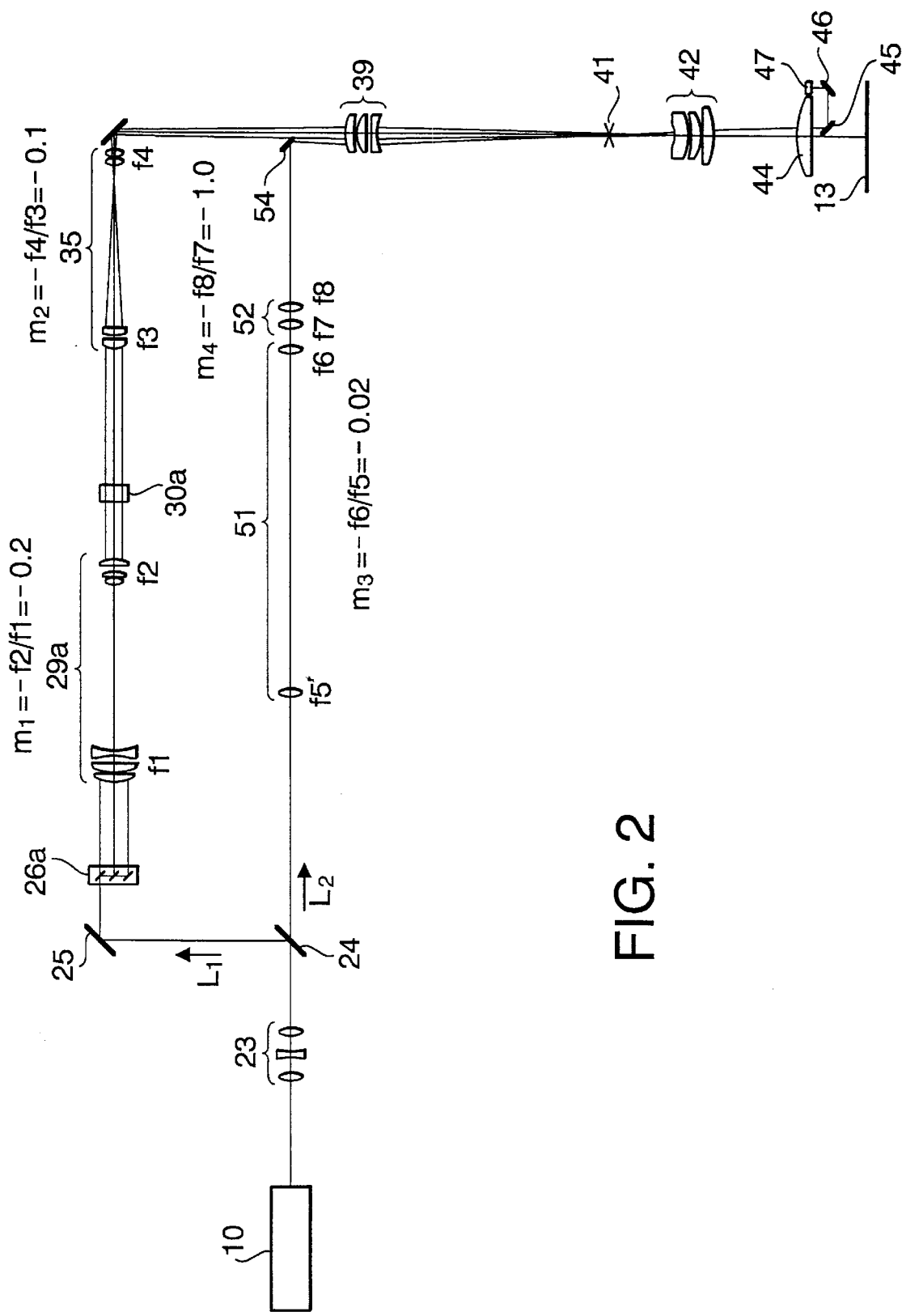
FIG. 2 is a developed view of the optical system of the scanning drawing apparatus shown in FIG. 1.

An embodiment of a scanning drawing apparatus 100 according to an embodiment of the present invention will be described with reference to FIGS. 1 and 2.

The scanning drawing apparatus 100 is provided with a light source 10 and an optical bench 11 that are stationary components, and a drawing table 12 that is movable in an X direction. Laser beam emitted from the light source 10 such as an argon laser travels through a scanning optical system arranged on the optical bench 11 and scans the image surface 13 placed on the drawing table 12 in an Y direction that is perpendicular to the X direction to form a scanning line S. In this description, a direction equivalent to the Y direction in consideration of reflections by mirrors is referred to as a main scanning direction, a direction equivalent to the X direction is referred to as an auxiliary scanning direction.

The light source 10 is arranged under the optical bench 11. The laser beam from the light source 10 is reflected by mirrors 20 and 21 to pass through a hole 11a, and then the laser beam is reflected by a mirror 22 to pass through a variable power optical system 23 that adjusts a beam diameter of the laser beam. A half mirror 24 as a beam separator divides the laser beam emerged from the variable power optical system 23 into a drawing beam $L_1$ (reflection beam, represented by a solid line) and a monitor beam $L_2$ (transmission beam, represented by a single-dot chain line).

The drawing beam $L_1$ is incident on a half mirror 25. The beam reflected by the half mirror 25 is incident on a multiple beam splitting element 26a that splits the incident beam into three beams. The beam passed through the half mirror 25 and reflected by a mirror 27 is incident on a multiple beam splitting element 26b that splits the incident beam into three beams.

The split drawing beams are incident on a first reducing optical systems 29a and 29b. Each of the first reducing optical systems 29a and 29b includes a pair of lens groups arranged on both sides of mirror 28a and 28b, respectively. The first reducing optical systems 29a and 29b lessen the space between the laser beams. The drawing beams from the first reducing optical systems 29a and 29b are incident on multi-channel acoustooptic modulators (AOM) 30a and 30b, respectively. Each of the multi-channel AOM's 30a and 30b is provided with a plurality of modulating units that independently modulate the drawing beams. The modulated drawing beams emerged from the AOM 30b enter a beam combiner 32 via a mirror 31. The modulated drawing beams emerged from the AOM 30a directly enter the beam combiner 32.

The six drawing beams combined by the beam combiner 32 are reflected by a mirror 33 to be incident on a second reducing optical system 35. The second reducing optical system 35 includes a pair of lens groups arranged on both sides of a mirror 34. The second reducing optical system 35 lessens the space between the laser beams. The drawing beams passed through the second reducing optical system 35 are incident on an image rotator 36 that adjusts the orientation of the six drawing beams such that the beam spots are aligned on a straight line that is inclined with both of the main and auxiliary scanning direction on the image surface 13.

On the other hand, the monitor beam $L_2$, which is a beam transmitted through the half mirror 24, is reflected by a mirror 50 to pass through a monitor reducing optical system 51 and a monitor power adjusting optical system 52, then the monitor beam $L_2$ is reflected by mirrors 53 and 54. The mirror 54, which is located between the rear lens group of the second reducing optical system 35 and the image rotator 36, is a beam combiner forcombing themonitorbeam with the drawing beams. The mirror 54 is located out of the optical path of the drawing beams so as to direct the monitor beam along the drawing beams. The drawing beams and the monitor beam are separated in the auxiliary scanning direction.

The drawing beams and the monitor beam emerged from the image rotator 36 are reflected by mirrors 37 and 38 to enter a collimator lens 39. The collimated beams emerged from the collimator lens 39 are incident on a polygon mirror 41 as a scanning deflector after reflected by a mirror 40. The polygon mirror 41 rotates in a counterclockwise direction in FIG. 1 for simultaneously deflecting the drawing beams and the monitor beam.

The deflected drawing beams and monitor beam are converged by an fθ lens 42, which is a scanning lines, and are directed toward the image surface 13 through a mirror 43 and a condenser lens 44. Since the drawing beams and the monitor beam are separated in the auxiliary scanning direction, the drawing beams reach the image surface 13 and only the monitor beam is reflected by a mirror 45. The drawing beams scan the image surface 13. The monitor beam is reflected by the mirror 45 and 46 and scans a monitor scale 47.

The monitor scale 47 is a transparent plate on which a large number of opaque lines are formed in the main scanning direction at a constant pitch. When the monitor beam $L_2$ scans the monitor scale 47, a photodetector, which receives transmission light through the monitor scale 47, outputs a pulse signal carrying a plurality of pulses which are output as the monitor beam traverses alternately formed transparent portions and opaque lines. An example of such a structure is disclosed in Japanese Patent Provisional Publication No. HEI 5-264913.

The variable power optical system 23 corrects variations in the beam diameter due to an individual difference of the light source 10. When a gas laser is used as the light source 10, the beam diameter may change due to elapse of time as well as the individual difference. The change of the beam diameter of the light source 10 changes the beam spot diameter on the image surface 13, which varies drawing characteristics. The variable power optical system 23 adjusts the beam diameter so as to keep the beam spot diameter constant. The variable power optical system 23 is arranged in a common optical path through which the drawing beam and the monitor beam travel, which avoids to cause a difference between magnification of the drawing beam and the monitor beam.

The optical system of the scanning drawing apparatus includes a drawing optical path through which only the drawing beams travel and a monitor optical path through which only the monitor beam travels. The optical path between the half mirror 24 and the mirror 54 is divided into a pair of the drawing optical path and the monitor optical path. The monitor optical path has a different optical path length from the drawing optical path and effective diameters of optical elements in the monitor optical path being different from effective diameters of optical elements in the drawing optical path. in this embodiment, each of the drawing optical path is longer than the monitor optical path and the effective diameter is larger in the drawing optical paths than in the monitor optical path.

The multiple beam splitting elements 26a and 26b, the first reducing optical systems 29a and 29b, and the multichannel AOM's 30a and 30b are arranged in the drawing optical path, while they are not necessary in the monitor optical path. This causes the difference in the optical path length. Further, the three parallel drawing beams travel along the drawing optical path, which requires a large effective diameter of the optical element in the drawing optical path. On the other hand, since only the single monitor beam proceeds along the monitor optical path, the optical elements do not require such a large effective diameter.

The optical systems along the drawing optical path and the monitor optical path are set such that a deviation of the beam spot of the drawing beam on the image surface 13 due to an inclination or a shift of the light source 10 is substantially equal to a deviation of the beam spot of the monitor beam on the monitor scale 47 in terms of directions and amounts. Since the monitoring system detects the scanning position of the drawing beam in the main scanning direction, the difference of the deviation in the main scanning direction is a problem. Therefore, the optical systems are set so that the deviations in the main scanning direction are the same.

Along one of the drawing optical path, the drawing beam is reflected ten times in the main scanning direction and three times in the auxiliary scanning direction. Along the other drawing optical path, the drawing beam is reflected twelve times in the main scanning direction and three times in the auxiliary scanning direction. On the other hand, along the monitor optical path, the monitor beam is reflected eight times in the main scanning direction and five times in the auxiliary scanning direction.

Therefore, a difference between the number of times of reflections in the main scanning direction through the monitor optical path and that through the drawing optical path is an even number. Thus, the optical systems are set to satisfy the following condition;

$$m_M \approx m_D$$

where $m_M$ is a magnification of the optical system between the light source 10 and the monitor scale 47 through the monitor optical path, and $m_D$ is a magnification of the optical system between the light source 10 and the image surface 13 through said drawing optical path.

With this construction, the deviation of the drawing beam on the image surface 13 is substantially equal to the deviation of the monitor beam on the monitor scale 47 in terms of directions and amounts.

When the difference between the number of times of reflections in the main scanning direction through the monitor path and that through the drawing optical path is an odd number, the optical systems will set to satisfy the following condition;

$$m_M \approx -m_D.$$

Further, the light source 10 is geometric-optically conjugate with the monitor scale 47 through the monitor optical path, and the light source 10 is geometric-optically conjugate with the imagesurface 13 through the drawing optical path. The optically conjugate relationships can reduce the deviations of the drawing beam on the image surface 13 and the deviations of the monitor beam on the monitor scale 47 due to the inclination of the optical axis of the light source 10.

The setting of the magnifications will be described with reference to FIG. 2. FIG. 2 is a developed view of the optical system shown in FIG. 1 in which one of two drawing optical systems is omitted for the sake of simplicity.

The magnification $m_1$ of the first reducing optical system 29a in the drawing optical path is represented by the following equation;

$$m_1 = -f_2/f_1$$

where $f_1$ is a focal length of the front lens group of the first reducing optical system 29a, and $f_2$ is a focal length of the rear lens group thereof. In the same manner, the magnification $M_2$ of the second reducing optical system 35 in the drawing optical path is represented by the following equation;

$$m_2 = -f_4/f_3$$

where $f_3$ is a focal length of the front lens group of the second reducing optical system 35, and $f_4$ is a focal length of the rear lens group thereof. In the embodiment, $m_1=-0.2$ and $m_2=-0.1$, the magnification n of the drawing optical system is equal to 0.02.

On the other hand, the magnification $m_3$ of the monitor reducing optical system 51 in the monitor optical path is represented by the following equation;

$$m_3 = -f_6/f_5$$

where $f_5$ is a focal length of the front lens group of the monitor reducing optical system 51, and $f_6$ is a focal length of the rear lens group thereof. In the same manner, the magnification $m_4$ of the monitor power adjusting optical system 52 in the monitor optical path is represented by the following equation;

$$m_4 = -f_8/f_7$$

where $f_7$ is a focal length of the front lens group of the monitor power adjusting optical system 52, and $f_8$ is a focal length of the rear lens group thereof. In the embodiment, $m_3=-0.02$ and $m_4=-1.0$, the magnification $m_M$ of the monitor optical system is also equal to 0.02.

When the difference of the number of reflections in the main scanning direction is an even number as described above, the setting of $m_M=m_D$ eqluates the deviation of the drawing beam on the image surface 13 with the deviation of the monitor beam on the monitor scale 47 in their directions and amounts.

Figure 4:
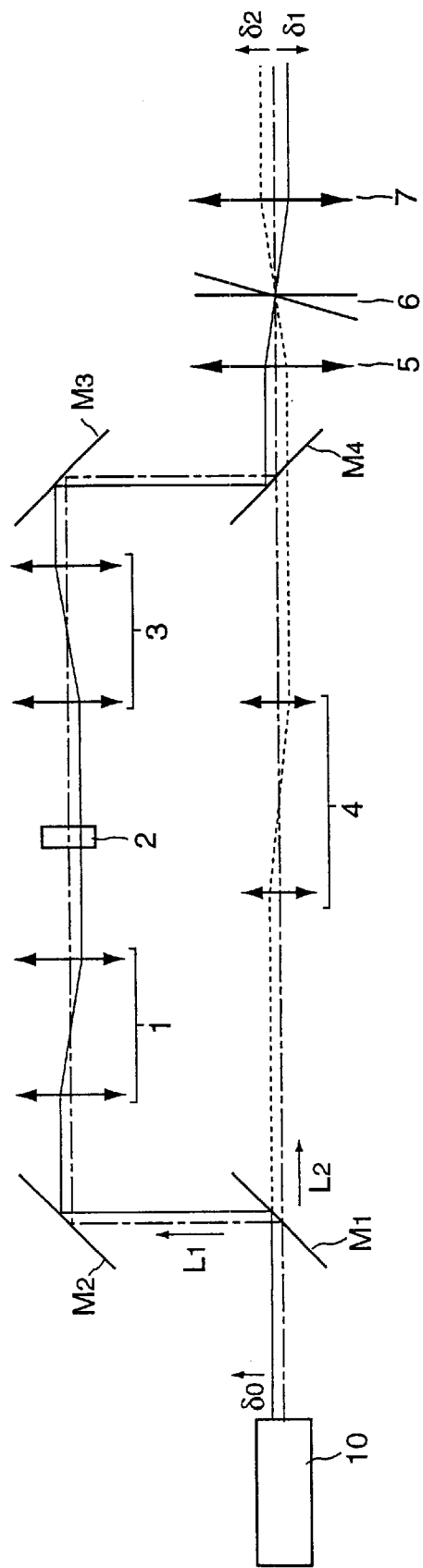
FIG. 4 is a development of an optical system of a conventional scanning drawing apparatus.

The deviations of the drawing beam and the monitor beam due to shift of the optical axis of the light source will be described with reference to FIGS. 3A and 3B. The optical system is simplified in FIGS. 3A and 3B and the symbols are assigned similarly to those in FIG. 4.

FIG. 3A shows the optical system where the difference of the number of reflections is an even number, while FIG. 3B shows the optical system where the difference of the number of reflections is an odd number.

In the optical system of FIG. 3A, the first reducing optical system 1, the AOM 2 and the second reducing optical system 3 are arranged in the drawing optical path, the monitor first optical system 4a and the monitor second optical system 4b are arranged in the monitor optical path. The drawing beam $L_1$ is reflected by four mirrors $M_1$, $M_2$, $M_3$ and $M_4$, while the monitor beam $L_2$ is not reflected. Therefore, the difference of the number of reflections is equal to four. For example, the magnification of the optical system along the drawing optical path is equal to 0.02, and the magnification of the optical system along the monitor optical path is also equal to 0.02 ($m_M=m_D$).

In FIG. 3A, when the light source 10 is at the proper position so that the optical axis of the light source 10 is coincident with the optical axis of the optical system represented by a single-dot chain line, the drawing beam $L_1$ and the monitor beam $L_2$ travel along the optical axis of the optical system, which does not causes the deviation between the beams. On the other hand, when the light source 10 shifts in the upward direction in FIG. 3A by $\delta_0$, the drawing beam $L_1$ travels along a solid line and the beam spot on the image surface shifts in the downward direction by $\delta_2$, while the monitor beam $L_2$ travels along a dotted line and the beam spot on the monitor scale shifts in the downward direction by $\delta_2$. Since the magnification for the drawing beam is equal to that for the monitor beam, the deviations are the same ($\delta_1=\delta_2$).

The optical system in FIG. 3B includes the first and second reducing optical systems 1 and 3 in the drawing optical path, and the monitor reducing optical system 4 in the monitor optical path. The drawing beam $L_1$ is reflected by five mirrors $M_1$, $M_2$, $M_3$, $M_4$, and $M_5$, while the monitor beam $L_2$ is not reflected. Therefore, the difference of the number of reflections is equal to five. For example, the magnification of the optical system along the drawing optical path is equal to 0.02, and the magnification of the optical system along the monitor optical path is equal to −0.02 ($m_M=-m_D$).

In FIG. 3B, when the light source 10 is at the proper position so that the optical axis of the light source 10 is coincident with the optical axis of the optical system represented by a single-dot chain line, the drawing beam $L_1$ and the monitor beam $L_2$ travel along the optical axis of the optical system, which does not causes the deviation between the beams. On the other hand, when the light source 10 shifts in the upward direction in FIG. 3B by $\delta_0$, the drawing beam $L_1$ travels along a solid line and the beam spot on the image surface shifts in the upward direction by $\delta_1$, while the monitor beam $L_2$ travels along a dotted line and the beam spot on the monitor scale shifts in the upward direction by $\delta_2$. Since the absolute value of the magnification for the drawing beam is equal to that for the monitor beam, the deviations are the same ($\delta_1=\delta_2$).

FIGS. 3A and 3B show the deviations due to the shift of the light source, while the setting of $m_M=m_D$ or $m_M=-m_D$ can equate the deviations due to the inclination of the optical axis of the light source in the same manner.

The deviations of the drawing beam spot and the monitor beam spot are the same in directions and amounts, which enables to keep the correlation between the monitor signal and the scanning position. As a result, the apparatus can accurately control the drawing beam even if the optical axis of the light source shifts or inclines.

The present disclosure relates to the subject matter contained in Japanese Patent Application No. HEI 10-289843, filed on Oct. 12, 1998, which is expressly incorporated herein by reference in its entirety.

What is claimed is:

1. A scanning drawing apparatus comprising:
   a light source for emitting a laser beam;
   a beam separator for dividing said laser beam from said light source into a drawing beam and a monitor beam;
   a drawing optical path through which said drawing beam travels;
   a monitor optical path through which said monitor beam travels, said monitor optical path having a different optical path length from said drawing optical path;
   a beam combiner for combining said drawing beam from said drawing optical path and said monitor beam from said monitor optical path;
   a scanning deflector for deflecting said drawing beam and said monitor beam combined by said beam combiner; and
   a scanning lens for converging said drawing beam and said monitor beam deflected by said scanning deflector to form beam spots on an image surface and a monitor scale, respectively, said monitor scale being located at a position equivalent to said image surface;
   wherein a deviation of the beam spot of said drawing beam on said image surface due to an inclination or a shift of said light source is coincident with a deviation of the beam spot of said monitor beam on said monitor scale in terms of directions and amounts.

2. The scanning drawing apparatus according to claim 1, wherein a difference between the number of times of reflections in a main scanning direction through said monitor optical path and that through said drawing optical path is an even number, and wherein the following condition is satisfied;

$$m_M \approx m_D$$

where
- $m_M$ is a magnification of an optical system between said light source and said monitor scale through said monitor optical path, and
- $m_D$ is a magnification of an optical system between said light source and said image surface through said drawing optical path.

3. The scanning drawing apparatus according to claim 1, wherein a difference between the number of times of reflections in a main scanning direction through said monitor optical path and that through said drawing optical path is an odd number, and wherein the following condition is satisfied;

$$m_M \approx -m_D$$

where
- $m_M$ is a magnification of an optical system between said light source and said monitor scale through said monitor optical path, and
- $m_D$ is a magnification of an optical system between said light source and said image surface through said drawing optical path.

4. The scanning drawing apparatus according to claim 1, wherein said light source is optically conjugate with said monitor scale through said monitor optical path, and wherein said light source is optically conjugate with said image surface through said drawing optical path.

5. The scanning drawing apparatus according to claim 1, further comprising a variable power optical system located between said light source and said beam separator for adjusting a beam diameter of the laser beam emitted from said light source.

6. A scanning drawing apparatus comprising:
- a light source for emitting a laser beam;
- a beam separator for dividing said laser beam from said light source into a drawing beam and a monitor beam;
- a drawing optical path through which said drawing beam travels;
- a monitor optical path through which said monitor beam travels, effective diameters of optical elements in said monitor optical path being different from effective diameters of optical elements in said drawing optical path;
- a beam combiner for combining said drawing beam from said drawing optical path and said monitor beam from said monitor optical path;
- a scanning deflector for deflecting said drawing beam and said monitor beam combined by said beam combiner; and
- a scanning lens for converging said drawing beam and said monitor beam deflected by said scanning deflector to form beam spots on an image surface and a monitor scale, respectively, said monitor scale being equivalent to said image surface;

wherein a deviation of the beam spot of said drawing beam on said image surface due to an inclination or a shift of said light source is coincident with a deviation of the beam spot of said monitor beam on said monitor scale in terms of directions and amounts.

7. The scanning drawing apparatus according to claim 6, wherein a difference between the number of times of reflections in a main scanning direction through said monitor optical path and that through said drawing optical path is an even number, and wherein the following condition is satisfied;

$$m_M \approx m_D$$

where
- $m_M$ is a magnification of an optical system between said light source and said monitor scale through said monitor optical path, and
- $m_D$ is a magnification of an optical system between said light source and said image surface through said drawing optical path.

8. The scarning drawing apparatus according to claim 6, wherein a difference between the number of times of reflections in a main scanning direction through said monitor optical path and that through said drawing optical path is an odd number, and wherein the following condition is satisfied;

$$m_M \approx -m_D$$

where
- $m_M$ is a magnification of an optical system between said light source and said monitor scale through said monitor optical path, and
- $m_D$ is a magnification of an optical system between said light source and said image surface through said drawing optical path.

9. The scanning drawing apparatus according to claim 6, wherein said light source is optically conjugate with said monitor scale through said monitor optical path, and wherein said light source is optically conjugate with said image surface through said drawing optical path.

10. The scanning drawing apparatus according to claim 6, further comprising a variable power optical system located between said light source and said beam separator for adjusting a beam diameter of the laser beam emitted from said light source.

11. A scanning drawing apparatus comprising:
- a light source for emitting a laser beam;
- a beam separator for dividing said laser beam from said light source into a drawing beam and a monitor beam;
- a drawing optical path through which said drawing beam travels;
- a monitor optical path through which said monitor beam travels, said monitor optical path having a different optical path length from said drawing optical path;
- a beam combiner for combining said drawing beam from said drawing optical path and said monitor beam from said monitor optical path;
- a scanning deflector for deflecting said drawing beam and said monitor beam combined by said beam combiner; and
- a scanning lens for converging said drawing beam and said monitor beam deflected by said scanning deflector to form beam spots on an image surface and a monitor scale, respectively, said monitor scale being located at a position equivalent to said image surface;

wherein a deviation of the beam spot of said drawing beam in a main scanning direction on said image surface due to an inclination or a shift of said light source is equal to a deviation of the beam spot of said monitor beam on said monitor scale at least in said main scanning direction.

12. A scanning drawing apparatus, comprising:

a light source for emitting a laser beam;

a beam separator for dividing said laser beam from said light source into a drawing beam and a monitor beam;

a scanning deflector for deflecting said drawing beam and said monitor beam to scan in a predetermined scanning direction;

a scanning lens for converging said drawing beam and said monitor beam deflected by said scanning deflector to form beam spots on an image surface and a monitor scale, respectively, said monitor scale being located at a position equivalent to said image surface;

a first optical system that directs said drawing beam to said image surface via said scanning deflector and said scanning lens; and a second optical system that directs said monitor beam to said monitor scale via said scanning deflector and said scanning lens, said first and second optical systems having different optical path lengths, wherein said first and second optical system are constituted such that a deviation of the beam spot of said drawing beam on said image surface due to an inclination or a shift of said light source substantially equals to a deviation of the beam spot of said monitor beam on said monitor scale in said predetermined scanning direction.

* * * * *